(12) United States Patent
Yukawa

(10) Patent No.: US 9,669,666 B2
(45) Date of Patent: Jun. 6, 2017

(54) RUNFLAT TIRE

(71) Applicant: SUMITOMO RUBBER INDUSTRIES, Ltd., Kobe-shi (JP)

(72) Inventor: Naoki Yukawa, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 472 days.

(21) Appl. No.: 13/962,083

(22) Filed: Aug. 8, 2013

(65) Prior Publication Data

US 2014/0048193 A1    Feb. 20, 2014

(30) Foreign Application Priority Data

Aug. 20, 2012    (JP) ................................ 2012-181827

(51) Int. Cl.
*B60C 5/14*      (2006.01)
*B60C 9/22*      (2006.01)
(Continued)

(52) U.S. Cl.
CPC .......... *B60C 17/0045* (2013.04); *B60C 5/142* (2013.04); *B60C 13/001* (2013.04);
(Continued)

(58) Field of Classification Search
CPC .... B60C 9/18; B60C 9/20; B60C 9/22; B60C 9/2204; B60C 5/14; B60C 5/142;
(Continued)

(56) References Cited

U.S. PATENT DOCUMENTS 5,427,176 A  *  6/1995  Hayashi .................... B60C 9/20
                                                              152/454
8,733,414 B2 *  5/2014  Rittweger ............. B60C 13/001
                                                              152/523

(Continued)

FOREIGN PATENT DOCUMENTS

EP              481687     * 12/1994
EP             1970221     *  9/2008
(Continued)

OTHER PUBLICATIONS

Machine translation of FR 1158208, 1958.*
(Continued)

*Primary Examiner* — Justin Fischer
(74) *Attorney, Agent, or Firm* — Oblon, McClelland, Maier & Neustadt, L.L.P.

(57) ABSTRACT

A runflat tire includes a tire body, a carcass extending from a tread portion through sidewall portions of the tire body to bead cores in bead portions of the tire body, and sidewall-reinforcing rubber layers having cross-sectional crescent shapes and positioned on inner sides of the carcass along the sidewall portions, respectively. The tire body has height Ha in range of 8~17 mm where the height Ha is measured from a rim line of the tire body to inner edge of an innermost dimple/fin row of the tire body in radial direction of the tire body, the innermost row is formed in dimple/fin forming region including one or more dimple/fin rows having dimple/fin portions arrayed in circumferential direction of the tire body, and the dimple/fin forming region is formed on external surface of a sidewall portion on outer side of the rim line in the radial direction.

20 Claims, 7 Drawing Sheets

(51) Int. Cl.
*B60C 15/024* (2006.01)
*B60C 13/02* (2006.01)
*B60C 17/04* (2006.01)
*B60C 17/00* (2006.01)
*B60C 13/00* (2006.01)

(52) U.S. Cl.
CPC .......... *B60C 13/02* (2013.01); *B60C 17/0009* (2013.04); *B60C 15/024* (2013.01); *B60C 2017/0063* (2013.04)

(58) Field of Classification Search
CPC ... B60C 17/00; B60C 17/0009; B60C 15/024; B60C 15/0242; B60C 13/02; B60C 13/023
See application file for complete search history.

(56) References Cited

U.S. PATENT DOCUMENTS

2010/0193102 A1    8/2010   Tsuruta et al.
2011/0005655 A1*   1/2011   Imoto ...................... B60C 9/28
                                                    152/517

FOREIGN PATENT DOCUMENTS

| EP | 2 181 865 A1 | | 5/2010 |
|---|---|---|---|
| FR | 1049414 | * | 12/1953 |
| FR | 1158208 | * | 6/1958 |
| JP | 03143710 | * | 6/1991 |
| JP | 09-002028 A | | 1/1997 |
| JP | 10-58925 | * | 3/1998 |
| JP | 10058925 | * | 3/1998 |
| JP | 2000-198324 | * | 7/2000 |
| JP | 2009-298397 A | | 12/2009 |
| JP | 2010-42739 | * | 2/2010 |
| JP | 2012-254706 | * | 12/2012 |
| WO | WO 2010/061578 A1 | | 6/2010 |

OTHER PUBLICATIONS

Machine translation of FR 1049414, 1953.*
Extended European Search Report issued Dec. 2, 2013 in Patent Application No. 13179518.9.

* cited by examiner

Fig. 4
(A)
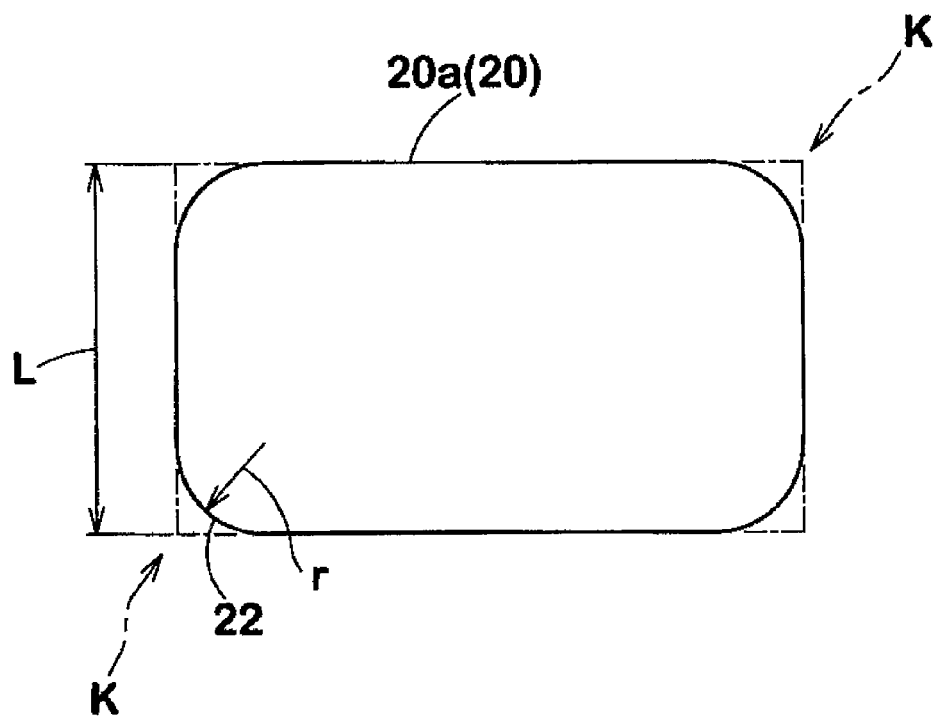
(B)
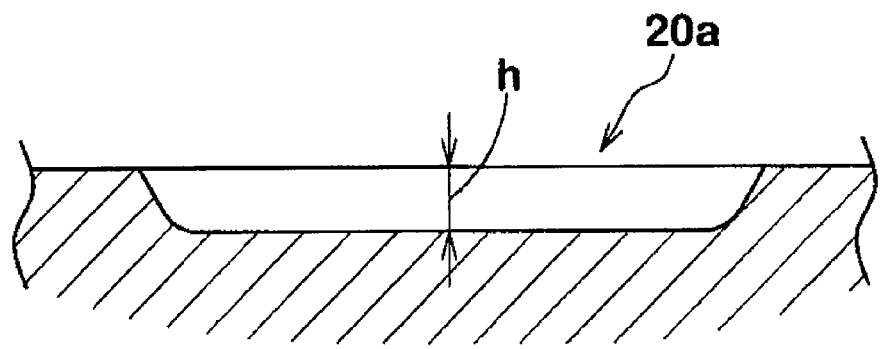

Fig. 6
(A)
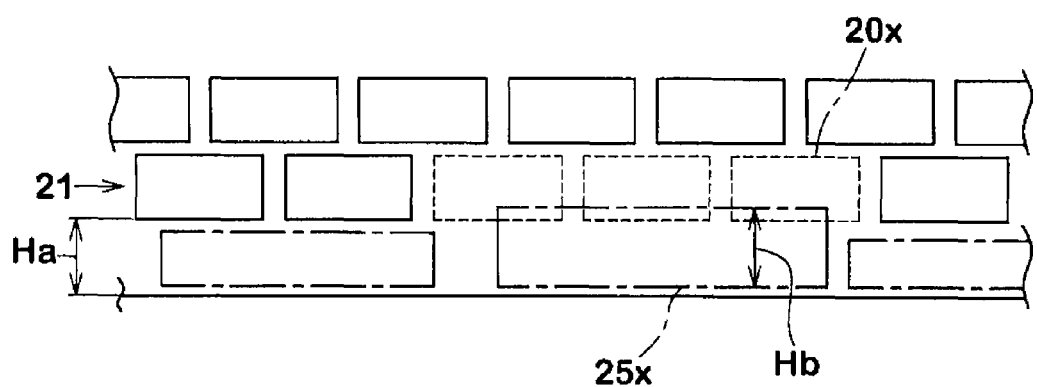
(B)
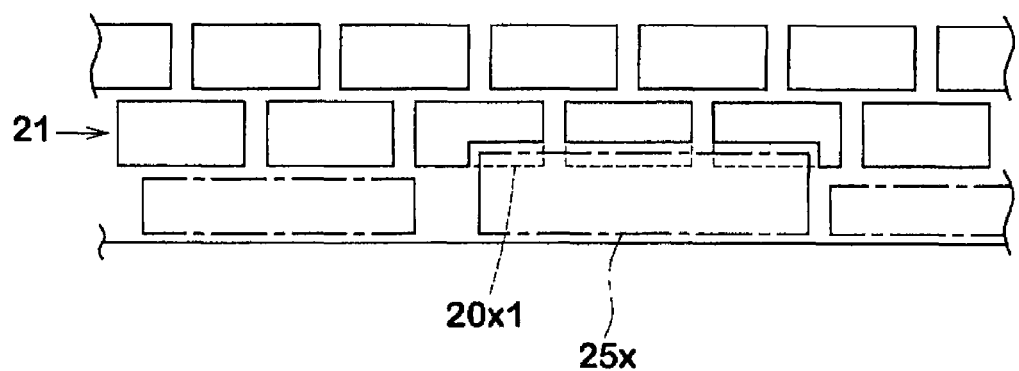

RUNFLAT TIRE

CROSS-REFERENCE TO RELATED APPLICATIONS

The present application is based upon and claims the benefit of priority to Japanese Patent Application No. 2012-181827, filed Aug. 20, 2012, the entire contents of which are incorporated herein by reference.

BACKGROUND OF THE INVENTION

Field of the Invention

The present invention relates to a runflat tire with improved durability when deflated.

Description of Background Art

There are varieties of runflat tires proposed, which can be driven for relatively long distances when deflated by punctures or the like, for example. Runflat tires having multiple dimples formed to be recessed on the external surfaces of sidewall portions (see Japanese Laid-Open Patent Publication No. 2009-298397, for example) have been proposed in recent years. However, to comply with the regulations of the location in which the tires are sold, pneumatic tires have a regulation-marking space on the bead side of the sidewall portion to mark the contents required by the regulations to be marked. Therefore, in addition to the regulation-marking space, a marking space for non-regulated contents, which are not required by the regulations to be marked, is also formed on the bead-side sidewall portions of pneumatic tires. As a result, it is difficult to form dimples or fins on the bead-side portions, thus further improvement in the durability of deflated runflat tires has been inhibited. The entire contents of this publication are incorporated herein by reference.

SUMMARY OF THE INVENTION

According to one aspect of the present invention, a runflat tire includes a tire body, a carcass extending from a tread portion of the tire body through sidewall portions of the tire body to bead cores in bead portions of the tire body, and sidewall-reinforcing rubber layers each having a cross-sectional crescent shape and positioned on inner sides of the carcass along the sidewall portions, respectively. The tire body has a height Ha in a range of 8~17 mm where the height Ha is measured from a rim line of the tire body to an inner edge of an innermost dimple/fin row of the tire body in a radial direction of the tire body, the innermost dimple/fin row is formed in a dimple/fin forming region including one or more dimple/fin row having dimple portions or fin portions arrayed in a circumferential direction of the tire body, the dimple portions or fin portions are formed to cool the tire body, the dimple/fin forming region is formed on an external surface of one of the sidewall portions on an outer side of the rim line in the radial direction of the tire body, the external surface of the sidewall portion has a first marking-space forming region between the dimple/fin forming region and the rim line and a second marking-space forming region on an outer side of the dimple/fin forming region in the radial direction of the tire body, the first marking-space forming region forms first marking spaces including a main regulation-marking space to mark contents of regulations except for UTQG ratings among regulation-marking spaces to mark contents required by the regulations, and the second marking-space forming region forms second marking spaces including spaces for marking non-regulated contents not required by the regulations, the UTQG ratings or a combination thereof.

According to another aspect of the present invention, a runflat tire includes a tire body having sidewall portions, a tread portion between the sidewall portions and bead portions, a carcass formed inside the tire body such that the carcass is extending along a surface of the tire body from one bead core in one of the bead portions of the tire body through the tread portion of the tire body to another bead core in the other bead portion of the tire body, and sidewall-reinforcing rubber layers positioned on inner sides of the carcass along the sidewall portions, respectively. The tire body has a height Ha in a range of 8~17 mm where the height Ha is measured from a rim line of the tire body to an inner edge of an innermost dimple/fin row of the tire body in a radial direction of the tire body, the innermost dimple/fin row is formed in a dimple/fin forming region including one or more dimple/fin row having dimple portions or fin portions arrayed in a circumferential direction of the tire body, the dimple portions or fin portions are formed to cool the tire body, and the dimple/fin forming region is formed on an external surface of one of the sidewall portions on an outer side of the rim line in the radial direction of the tire body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(A) and 4(B) are a front view and a cross-sectional view respectively showing a dimple/fin section formed with dimples;

FIGS. 6(A) and 6(B) are partial side views showing methods (A, B) to further reduce height (Ha)

DETAILED DESCRIPTION OF THE EMBODIMENTS

Figure 1:
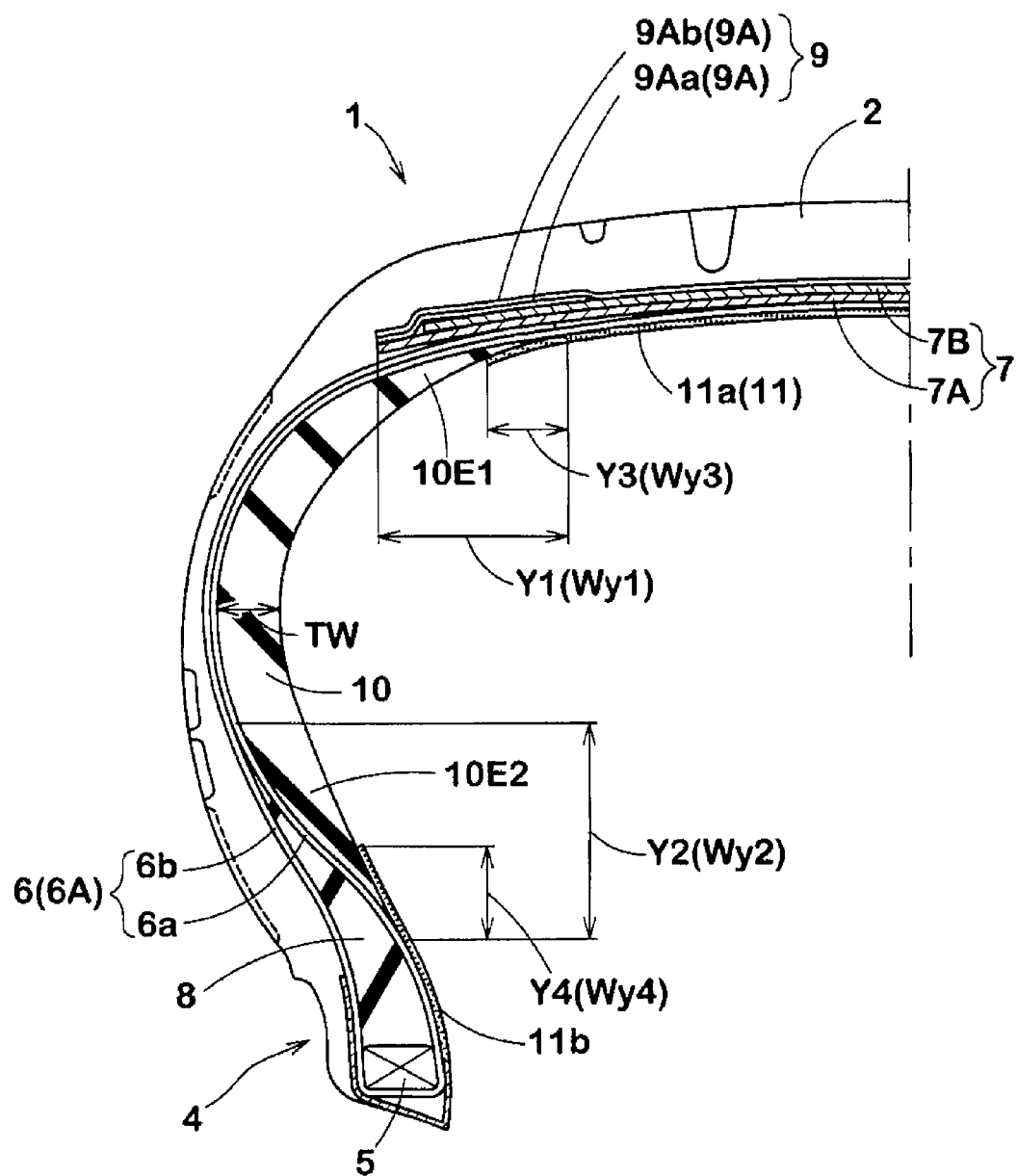
FIG. 1 is a cross-sectional view showing an example of a runflat tire according to an embodiment of the present invention.

The embodiments will now be described with reference to the accompanying drawings, wherein like reference numerals designate corresponding or identical elements throughout the various drawings.

As shown in FIG. 1, runflat tire 1 of the present embodiment has carcass 6 extending from tread portion 2 through sidewall portion 3 on either side to bead core 5 of bead portion 4, and cross-sectional crescent-shaped sidewall-reinforcing rubber layer 10 positioned inside carcass 6 and sidewall section 3.

Carcass 6 is formed with one or more plies of carcass cord arrayed at an angle of 75~90 degrees relative to a circumferential direction of the tire. In the present embodiment, there is one carcass ply (6A). Carcass ply (6A) has toroidal ply body (6a) spanning between bead cores (5, 5), and folded ply portion (6b) which is connected to either end of the ply body and folded at bead core 5 from the inner side toward the outer side of the tire in an axial direction. Bead apex rubber 8 is positioned between ply body (6a) and folded ply portion (6b).

The cross section of bead apex rubber 8 is shaped triangular extending from bead core 5 and tapering toward the outer side of the tire in a radial direction. Bead apex rubber 8 is made of highly elastic rubber, and reinforces the area from bead portion 4 toward sidewall portion 3. Folded ply portion (6b) extends beyond the outer edge of bead apex rubber 8 toward the outer side of the tire in a radial direction. In the present embodiment, the outer edge of folded ply portion (6b) of the tire in a radial direction ends by being sandwiched between carcass 6 and belt layer 7. Setting such a way enhances tire rigidity and contributes to securing durability and steering stability while driving on a deflated runflat tire.

Belt layer 7 is positioned on the outer side of carcass 6 in a radial direction as well as in the inner portion of tread portion 2 of the tire. Belt layer 7 is formed with two or more plies of belt cord positioned at an approximate angle of 10~35 degrees, for example, relative to a circumferential direction of the tire. In the present embodiment, belt layer 7 is formed with two belt plies (7A, 7B). Belt cords cross over each other between the plies. Accordingly, belt rigidity is enhanced and substantially the entire width of tread portion 2 is reinforced by the tightening effects of the belt cords.

In the present embodiment, band layer 9 is formed on the outer side of belt layer 7 in a radial direction of the tire for purposes of enhancing high-speed durability. Band layer 9 is formed using one or more band plies (9A), which are made by winding band cords in a spiral fashion at an angle of 5 degrees or less relative to the circumference of the tire. As for band plies (9A), a pair of edge band plies (9Aa) on right and left of belt layer 7 covering both of its outer edges in an axial direction of the tire, as well as full band ply (9Ab) covering substantially the entire width of belt layer 7, may be used as desired. The present embodiment shows an example where band layer 9 is formed with a pair of edge band plies (9Aa) and one full band ply (9Ab).

The cross section of sidewall-reinforcing rubber layer 10 is shaped in a crescent extending from the center with maximum thickness (Tm) toward the inner and outer sides of the tire in a radial direction while its thickness is reduced gradually. In the present embodiment, outer edge portion (10E1) of sidewall-reinforcing rubber layer 10 in a radial direction of the tire extends beyond the outer edge of belt layer 7 toward the inner side in an axial direction of the tire. Accordingly, overlapping portion (Y1) with belt layer 7 is formed. Also, inner edge portion (10E2) of sidewall-reinforcing rubber layer 10 of the tire in a radial direction extends beyond the outer edge of bead apex rubber 8 toward the inner side in a radial direction of the tire. Accordingly, overlapping portion (Y2) with bead apex rubber 8 is formed.

The reinforcement effects of sidewall-reinforcing rubber layer 10 are further enhanced by overlapping portions (Y1, Y2), and durability and steering stability are secured while driving on a deflated runflat tire. For such purposes, overlapping widths (Wy1, Wy2) of overlapping portions (Y1, Y2) are preferred to be in a range of 5~50 mm. If the widths are less than 5 mm, it is difficult for sidewall-reinforcing rubber layer 10 to function effectively. On the other hand, if the widths exceed 50 mm, the tire mass would increase unnecessarily, thus having an adverse effect on mileage. Therefore, it is preferred that the minimum value of overlapping widths (Wy1, Wy2) be 10 mm or greater and the maximum value be 40 mm or less.

When driving on a deflated runflat tire, the compressive load is exerted on sidewall-reinforcing rubber layer 10 while the tensile load is exerted on carcass ply body (6a) adjacent to sidewall-reinforcing rubber layer 10. During that time, sidewall-reinforcing rubber layer 10 resists well against the compressive load since the layer is made of a lump of rubber. Also, the carcass cords resist well against the tensile load. As a result, the bending rigidity of sidewall portion 3 is well enhanced, thus suppressing vertical bending of the tire while driving on a deflated runflat tire. Namely, runflat performance (durability and steering stability) is exhibited.

In sidewall-reinforcing rubber layer 10, it is preferred that complex elastic modulus ($E^*$) be 6~12 MPa and loss tangent (tan δ) be 0.02~0.05. If complex elastic modulus ($E^*$) is lower than 6 MPa, the bending rigidity of sidewall portion 3 is insufficient and runflat performance tends to decrease, or the rubber thickness of sidewall-reinforcing rubber layer 10 is set greater to secure bending rigidity, thus causing an increase in tire mass. In addition, heat accumulation increases, reducing the durability of deflated runflat tires. On the other hand, if complex elastic modulus ($E^*$) exceeds 12 MPa, riding comfort is reduced and the ease of processing the rubber decreases when forming it into tires, thus lowering productivity. Meanwhile, when loss tangent (tan δ) exceeds 0.05, more heat is generated, reducing the durability of deflated runflat tires. By contrast, if loss tangent (tan δ) is lower than 0.02, the strength of the rubber is reduced accordingly, thus reducing the durability of deflated runflat tires.

Maximum thickness (Tm) of sidewall-reinforcing rubber layer 10 is usually in a range of 3~20 mm, although that may differ depending on tire types and sizes. The maximum thickness is preferred to be in a range of 6~12 mm for passenger car tires In addition, on the surface of the inner cavity of a tire, inner liner 11 is formed using gas impermeable rubber material. In the present embodiment, inner liner 11 is not present between inner edge portion (10E2) and outer edge portion (10E1) of sidewall-reinforcing rubber layer 10 in a radial direction of the tire. More specifically, inner liner 11 is divided into upper inner-liner portion (11a) positioned in tread portion 2 and lower inner-liner portion (11b) positioned in bead portion 4. The outer edge portion of upper inner-liner portion (11a) in an axial direction of the tire forms outer edge portion (10E1) of sidewall-reinforcing rubber layer 10 and overlapping portion (Y3). In addition, the outer edge portion of lower inner-liner portion (11b) in a radial direction of the tire forms inner edge portion (10E2) of sidewall-reinforcing rubber layer 10 and overlapping portion (Y4). Overlapping widths (Wy3, Wy4) of overlapping portions (Y3, Y4) are preferred to be 5~15 mm.

While driving on a deflated runflat tire, divided inner liner 11 smoothly exhausts the heat generated in sidewall-reinforcing rubber layer 10 into the inner cavity of the tire and suppresses a temperature rise in sidewall-reinforcing rubber layer 10. Since sidewall-reinforcing rubber layer 10 has sufficient thickness in the portion without inner liner 11, the air tightness (air retention capability) in the inner cavity of the tire is secured. If overlapping widths (Wy3, Wy4) exceed 15 mm, the above-described heat-radiation effects decrease, and if the widths are less than 5 mm, air tightness (air retention capability) is negatively affected.

Figure 2:
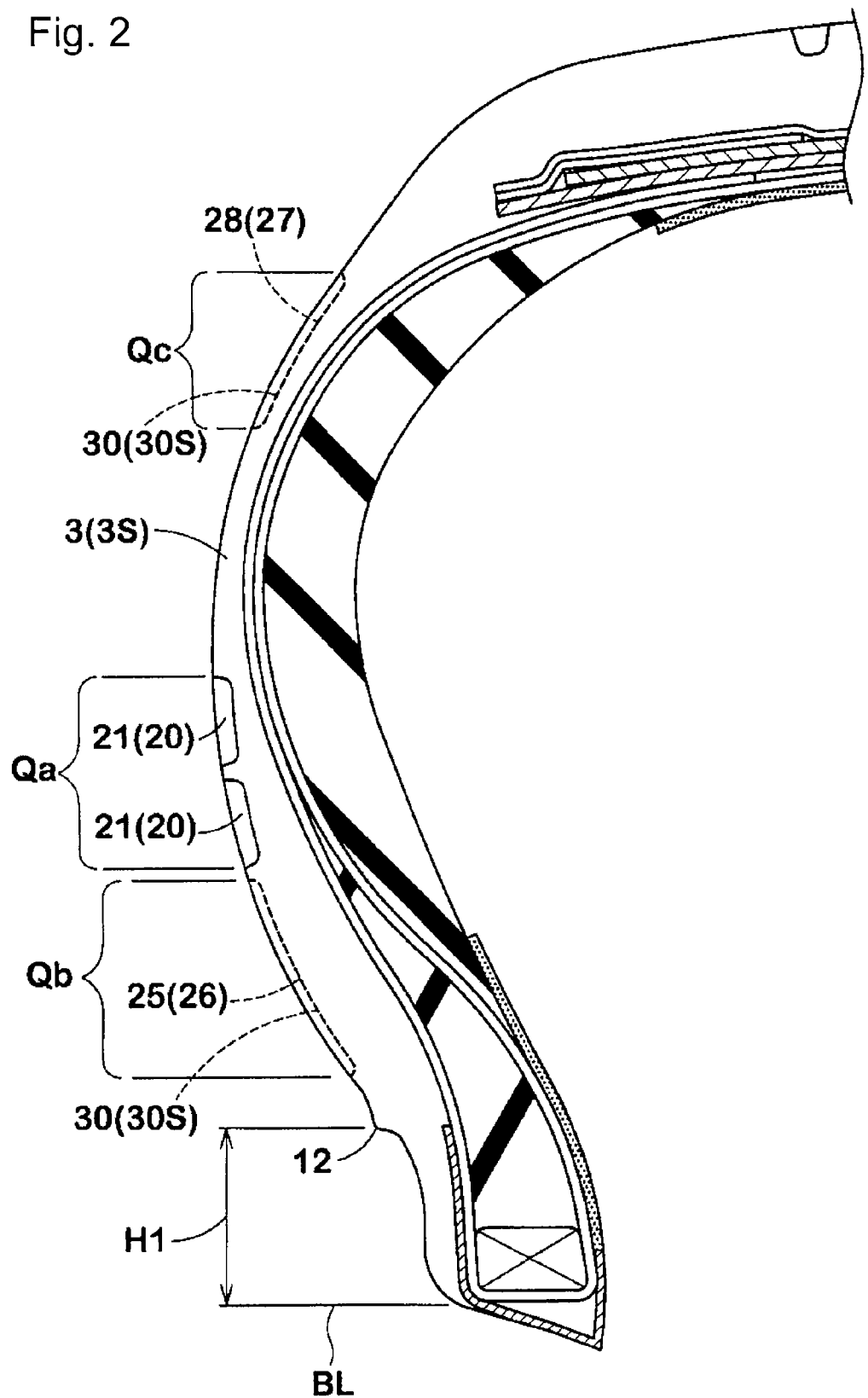
FIG. 2 is a partially enlarged view of FIG. 1.
Figure 3:
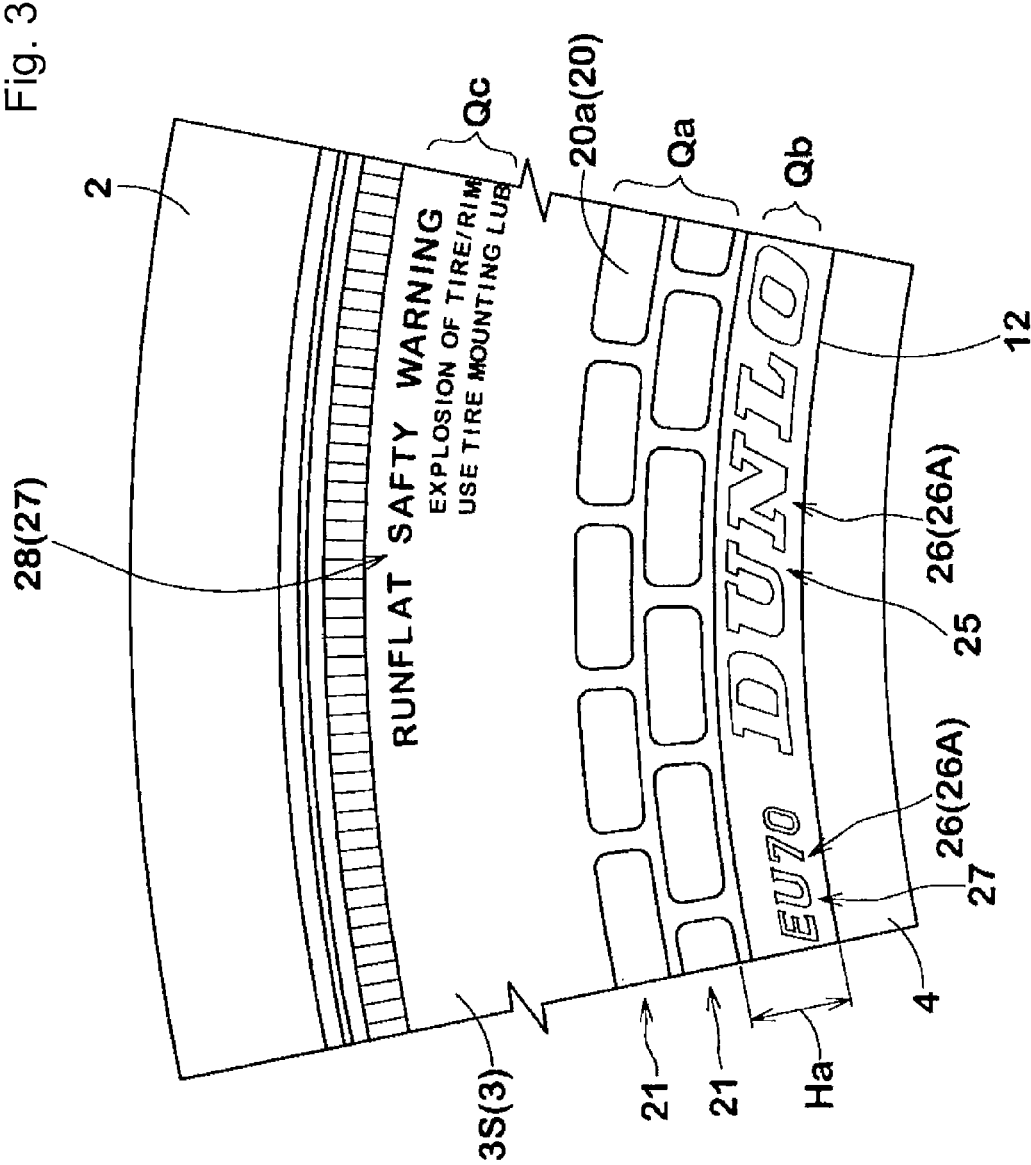
FIG. 3 is a side view partially showing the external surface of a sidewall portion.

Next, in runflat tire 1, dimple/fin forming region (Qa) and first and second marking-space forming regions (Qb, Qc) are formed on the outer side of rim line 12 in a radial direction of the tire and on the external surface (3S) of sidewall portion 3 as shown in FIGS. 2 and 3.

As widely known, rim line 12 described above is a thin line formed on the bead-side external surface and extending in a circumferential direction of the tire so that it is visually determined during the rim assembly process whether the tire and the rim are correctly assembled. Height (H1) from bead base line (BL) of rim line 12 in a radial direction is usually set to be positioned approximately 1.2 times as high as the rim flange.

In the above-described dimple/fin forming region (Qa), one or more dimple/fin rows 21 are formed, where dimple/fin portions 20 for cooling effect made up of dimples (20a) or fins (20b) are arrayed in a circumferential direction of the tire. The present embodiment shows an example where two dimple/fin rows 21 are formed respectively on the inner and outer sides of the tire in a radial direction. Such dimple/fin portions 20 increase surface areas while turbulent airflow is generated during driving so that cooler air makes contact with the surface of sidewall portion 3. Accordingly, the cooling effects are enhanced. When multiple dimple/fin rows 21 are arrayed, adjacent dimple/fin rows 21 in a radial direction of the tire are preferred to be positioned in such a way that dimple/fin portions 20 are shifted from each other by half a pitch in a circumferential direction of the tire. Such a setting is preferable for the durability of deflated runflat tires since the cooling effects become uniform.

The present embodiment shows an example where dimples (20a) are employed for dimple/fin portions 20. Dimple (20a) is a concave recessed in external surface (3S). As for the opening shape of dimple (20a) in external surface (3S), various shapes such as a circle, square, rectangle and hexagon may be employed, for example. However, to effectively generate turbulent airflow and subsequently to radiate heat, dimple (20a) is preferred to be in a rectangle shape formed to be long in a circumferential direction of the tire as shown in the present embodiment. When a polygonal shape (square, rectangle, hexagon or the like) is employed, arc 22 is preferred to be formed for corner (K) as shown in FIG. 4(A) because it is easier to clean tires. Regarding radius (r) of arc 22, if it is too small, dirt may clog in the corner and be hard to remove; and if it is too large, arc 22 comes closer to being circular and heat radiation effects decrease. Therefore, radius (r) is preferred to be approximately 25~35% of length (L) of the shorter side of the sides that form corner (K). Alternatively, if dimple (20a) is shaped in a polygon, a side is preferred to be 2~20 mm, and if it is shaped in a circle, the diameter is preferred to be 2~20 mm. Also, depth (h) of dimple (20a) is preferred to be 0.5~3.0 mm as shown in FIG. 4(B). When forming dimple (20a), its side and bottom surfaces are preferred to be joined smoothly by forming an crescent shape with an approximate radius of 0.7~3.0 mm to suppress cracking.

Figure 5:
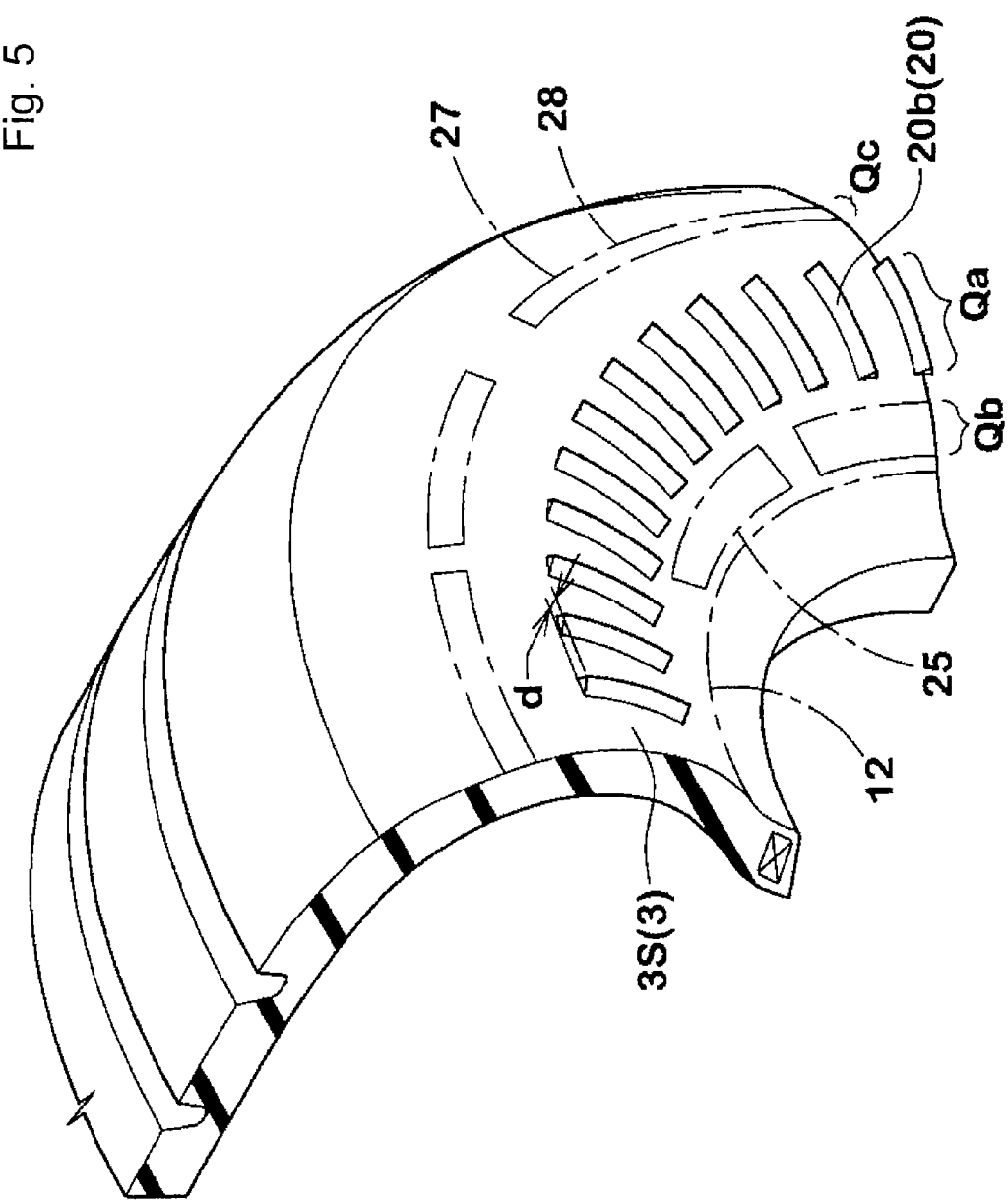
FIG. 5 is a perspective view showing a dimple/fin section formed with fins.

As for dimple/fin section 20, fins (20b) may be employed as shown in FIG. 5. Fin (20b) is a protruding rib formed in external surface (3S), and its height (d) is preferred to be 0.5~3.0 mm.

First marking-space forming region (Qb) is where first marking spaces 25 are formed, and is positioned between dimple/fin forming region (Qa) and rim line 12.

First marking spaces 25 include main regulation-marking space (26A), which is among regulation-marking spaces 26 to mark the contents required by the regulations to be marked, except for the UTQG (Uniform Tire Quality Grading) ratings.

The contents of the UTQG ratings are treadwear, traction and temperature of a tire required to be marked by the U.S. Department of Transportation, and they are required to be marked on the buttress side. Therefore, when forming the UTQG marking space in U.S.-spec tires, it is formed in second marking-space forming region (Qc) unlike other regulation marking spaces.

As for the contents of regulation markings, they differ depending on the location (including countries) in which the tires are sold, and some are set to be marked from among the following group "A": markings such as "size," "brand name," "DOT code," "week of production," "tubeless or tube-type," "radial," "snow tire," "reinforced/extra load," "material," "maximum permissible inflation pressure, maximum load rating," "country of approval," "E number" and "UTQG ratings."

Here, markings indicate as follows:

(a) "Size" indicates the size of a tire and is marked as, for example, "185/70R14 88S" or the like.

(b) "Brand name" indicates the product name or the name of manufacturer.

(c) "DOT code" indicates compliance with the safety standard required by the Department of Transportation and is marked as, for example, "DOT EU70AB" or the like.

(d) "Week of production" indicates the week and the year when tires are made and is marked as, for example, "3408" or the like, and often marked along with a factory code, size code, design code and the like.

(e) "Tubeless or tube-type," "radial" and "snow tire" indicate respectively that tires are tubeless, tube-type, radial, and snow tires.

(f) "Reinforced/extra load" indicates tires in compliance with European extra load standards and is marked as, for example, "REINFORCED" or the like.

(g) "Material" indicates the material of the tire.

(h) "Maximum permissible inflation pressure, maximum load rating" indicate the highest inflation pressure and maximum load rating allowed for the tire, and are marked as, for example, "MAX.PRESS.350 KPa," "MAX.LOAD 800 Kg" or the like.

(i) "Country of approval" indicates the country that approved the tire, for example, SNI for Indonesia and CCCS for China.

(j) "E number" indicates the tire is approved by European countries and is marked as, for example, "E4" or the like.

Among the markings in group "A" above, those that do not fall under the category of the regulations above are non-regulated contents, which are not required to be marked by the regulations. Some of such contents are marked in first marking spaces 25 together with main regulation-marking space (26A) in first marking-space forming region (Qb).

Second marking-space forming region (Qc) is where second marking spaces 28 are formed and positioned on the outer side of dimple/fin forming region (Qa) in a radial direction of the tire.

Second marking spaces 28 include non-regulated marking space 27 showing the non-regulated contents which are not required by the regulations to be marked and/or the marking space for the UTQG ratings, and do not include main regulation-marking space (26A). In addition, as for non-regulated marking space 27, non-regulated marking space 27 showing non-regulated contents in group A, and a marking space showing "safety warning," "runflat instructions" or the like are listed.

(k) "Safety warning" indicates instructions for use of the tire, and "runflat instructions" indicate instructions for driving on a deflated runflat tire.

The contents of regulation marking space 26 and non-regulated marking space 27 are marked by widely known letters, symbols and figures. Also, such markings are molded in a concave or convex shape on the external surface (3S) the same as those on conventional tires. However, as shown in FIG. 2, on external surface (3S) of sidewall portion 3, concave portion 30 is formed to recede from external surface (3S), and the markings may be molded on recessed surface (30S) at the bottom surface of concave portion 30. Namely, first marking spaces 25 and/or second marking spaces 28 may have their contents engraved in recessed surface (30S) recessed from external surface (3S). Such a setting is effective for forming lightweight tires and for confirming visually the molded contents.

As described, since the marking region is divided into first and second marking-space regions (Qb, Qc) positioned on the inner side and outer side respectively of dimple/fin forming region (Qa) in a radial direction of the tire, the width of first marking-space forming region (Qb) in a radial direction is reduced while complying with the regulations of the location where the tires are sold. Accordingly, height (Ha) from rim line 12 to the inner edge of innermost dimple/fin row 21 in a radial direction of the tire is reduced to be in a range of 8~17 mm. By reducing height (Ha) to 17 mm or less, temperature rise is suppressed on the bead-portion side that has greater impact on the durability of deflated runflat tires. Accordingly, the durability of deflated runflat tires is further enhanced.

Here, for some marking spaces including "week of production," the molding die for forming the marking space is replaceable with a vulcanizer die. Accordingly, if a molding die is too small, the replacement process is difficult to conduct, and problems stemming from the structure of the die may arise. Therefore, the width of a marking space in a radial direction of a tire is at least 6.4 mm, and thus height (Ha) described above is set at 8 mm or greater. Here, if height (Ha) exceeds 17 mm, the effect on the durability of deflated runflat tires is reduced.

Next, among first marking spaces 25, a particular marking space to display, for example, "brand name" is preferred to be enlarged to enhance design value. Namely, width (Hb) of such a space in a radial direction is preferred to be set as high as possible.

In such a situation, the following methods (A, B) are preferable. In method (A), a particular marking space described above is formed as enlarged marking space (25x) in which width (Hb) in a radial direction exceeds height (Ha) as shown in FIG. 6(A). Then, in dimple/fin row 21 positioned on the innermost side in a radial direction of the tire, only the dimple/fin portion (20) that interferes with such enlarged marking space (25x) is removed. In the drawing, removed dimple/fin portion (20x) is shown in broken lines.

Regarding method (B), in dimple/fin row 21 positioned on the innermost side in a radial direction of the tire, portion (20x1) which interferes with enlarged marking space (25x) is removed from dimple/fin portion (20x) as shown in FIG. 6(B). In the drawing, interfering portion (20x1) is shown in broken lines.

By so setting, height (Ha) is reduced to be 14 mm or less even with enlarged marking space 25. It is also preferable to employ both methods (A, B).

Figure 7:
FIG. 7 is a view illustrating another method to further reduce height (Ha).

First marking spaces 25 include a marking space for "maximum permissible inflation pressure, maximum load rating." Conventionally, such a marking space is structured to be a double row in a radial direction of a tire as shown in FIG. 7. Thus, the space inhibits height (Ha) from being reduced. Accordingly, the marking space is divided into a marking space for "maximum permissible inflation pressure" and another marking space for "maximum load rating," which are then positioned side by side in a circumferential direction of a tire. By so setting, height (Ha) is reduced to be 10 mm or less. Here, such a method is referred to as method (C) for description purposes.

So far, a preferred embodiment of the present invention has been described. However, the present invention is not limited to the embodiment shown in the drawings, and various modifications may be made to carry out the present invention.

EXAMPLES

According to the specifications shown in Table 1, runflat tires with a structure as shown in FIG. 1 (tire size 235/55R18) were manufactured for testing. Then, the durability of each runflat tire was tested and compared with each other. The inner structure of each tire is substantially the same. As for dimple/fin portions, rectangular dimples are used having a length in a radial direction of 8.8 mm, a length in a circumferential direction of 20.0 mm and a depth of 3 mm. The number of dimple/fin rows is two.

Comparative example 1 is a conventional tire where all the marking spaces (regulation-marking spaces and spaces for non-regulated contents) are formed in a first marking-space forming region. Comparative example 2 is a tire where a dimple/fin forming region is formed along the rim line without forming a first marking-space forming region (Ha=0). Examples 1 and 5 are tires where methods (A, C) are employed to reduce height (Ha) in a radial direction to 8 mm while complying with regulations. Example 2 is a tire where method (A) is employed to reduce height (Ha) in a radial direction to 10 mm while complying with regulations. Example 3 is a tire where method (B) is employed to reduce height (Ha) in a radial direction to 14 mm while complying with regulations. Example 4 is a tire where none of methods (A~C) is employed but height (Ha) in a radial direction is set at 17 mm while complying with regulations.

(1) Durability of Deflated Runflat Tires

Using a drum-type tire testing machine, runflat tires for testing assembled on a regular rim were driven under conditions of speed at 80 km/h, inflation pressure at 0 kPa and vertical load at 5.2 kN. Then, the tires are evaluated by comparing their respective running distances until abnormal noise occurs in the tires when the distance of comparative example 1 is used as an index set at 100. The greater the index, the more excellent the durability.

TABLE 1

| | comparative example 1 | comparative example 2 | example 1 | example 2 | example 3 | example 4 | example 5 |
|---|---|---|---|---|---|---|---|
| first marking-space forming region | formed | not formed | | | formed | | |
| second marking-space forming region | not formed | not formed | | | formed | | |

TABLE 1-continued

| | comparative example 1 | comparative example 2 | example 1 | example 2 | example 3 | example 4 | example 5 |
|---|---|---|---|---|---|---|---|
| shifting amount of dimple/fin row s | | | ½ pitch | | | | none |
| height (Ha) (mm) in a radial direction | 25 | 0 | 8 | 10 | 14 | 17 | 8 |
| durability of deflated runflat tire | 100 | 187 | 176 | 165 | 152 | 141 | 170 |

As shown in the table above, it is confirmed that the durability of deflated runflat tires in the examples is enhanced while complying with the regulations. Although comparative example 2 showed excellent durability of a deflated tire, the contents are not marked according to the regulations because the dimple/fin forming region is formed along the rim line without leaving space for a first marking-space forming region.

A runflat tire according to an embodiment of the present invention provides enhanced durability when deflated by setting aside part of or the entire non-regulated marking space as a second marking-space forming region located on the outer side of a dimple/fin forming region in a radial direction of the tire so that dimples or fins are formed closer to the bead side.

A runflat tire according to an embodiment of the present invention has a carcass extending from the tread portion through a sidewall portion on either side to the bead core of a bead portion, and a sidewall-reinforcing rubber layer in a cross-sectional crescent shape positioned on the inner side of the carcass and along the sidewall portion. On the outer side of the rim line in a radial direction of the tire and on the external surface of the sidewall portion, such a runflat tire has the following regions: a dimple/fin forming region where one or more dimple/fin rows are formed with dimple/fin portions made up of dimples or fins for cooling purposes and are arrayed in a circumferential direction of the tire; between the dimple/fin forming region and the rim line, a first marking-space forming region to form first marking spaces; and on the outer side of the dimple/fin forming region in a radial direction of the tire, a second marking-space forming region to form second marking spaces.

The first marking spaces include a main regulation-marking space to mark the contents of regulations except for UTQG (Uniform Tire Quality Grading) ratings among the regulation-marking spaces to mark the contents required by the regulations to be marked, and the second marking spaces include spaces for marking the non-regulated contents which are not required by the regulations to be marked and/or the UTQG (Uniform Tire Quality Grading) ratings.

When measured from the rim line to the inner edge of the innermost dimple/fin row in a radial direction of the tire, height (Ha) in a radial direction of the tire is set at 8~17 mm.

The height (Ha) may be set at 8~14 mm, and the first marking spaces include a larger marking space having a width (Hb) in a radial direction that is greater than height (Ha), while a dimple/fin portion that interferes with the larger marking space is removed, or part of a dimple/fin portion that interferes with the larger marking space is removed, from the innermost dimple/fin row in a radial direction of the tire.

The main regulation-marking space may include a space for making "maximum permissible inflation pressure, maximum load rating" and the space for marking "maximum permissible inflation pressure, maximum load rating" is divided into a marking space for "maximum permissible inflation pressure" and a marking space for "maximum load rating," which are then arrayed in one row in a circumferential direction of the tire so that height (Ha) is set to be 8~10 mm.

The dimple/fin forming region may contain two or more dimple/fin rows in a radial direction of the tire, while positions of adjacent dimple/fin rows in a radial direction of the tire are shifted from each other in a circumferential direction of the tire.

Complex elastic modulus (E*) of the sidewall-reinforcing rubber layer may be set at 6~12 MPa while the loss tangent (tan δ) is set at 0.02~0.05.

An inner liner made of gas impermeable rubber material may be formed on the inner surface of the tire cavity in such a way that the inner liner is not present between the inner edge and the outer edge of the sidewall-reinforcing rubber layer in a radial direction of the tire.

The contents of the first marking spaces and/or the second marking spaces may be molded in a concave surface recessed from the external surface of the sidewall portion.

In the present application, unless otherwise specified, measurements or the like of each portion of a tire are those obtained when the tire bead portions are held according to the rim width determined by the tire size when a rim is not attached to the tire.

Complex elastic modulus (E*) and loss tangent (tan δ) are values obtained based on JIS-K6394 using "a viscoelastic spectrometer" under the following conditions: initial stress (10%), amplitude (±1%), frequency (10 Hz), deformation mode (tension) and temperature at measuring time (70° C.).

In an embodiment of the present invention, first and second marking-space forming regions are provided on the inner side and outer side respectively of the dimple/fin forming region in a radial direction of the tire. Then, first marking spaces including regulation-marking spaces are formed in the first marking-space forming region, while second marking spaces for non-regulated contents are formed in the second marking-space forming region. However, regarding regulation-marking spaces of U.S.-specification tires, only the UTQG (Uniform Tire Quality Grading) spaces are required to be positioned on the buttress side. Therefore, only for U.S.-spec tires, marking spaces for the UTQG ratings are formed in the second marking-space forming region along with the above-described second marking spaces for non-regulated contents.

Accordingly, the width of the first marking-space forming region in a radial direction of the tire decreases so that height (Ha) is reduced to be 17 mm or less. As a result, dimple/fin portions are formed closer to the bead side, further enhancing the durability of a deflated runflat tire while complying with the regulations of the location where the tires are sold.

Obviously, numerous modifications and variations of the present invention are possible in light of the above teachings. It is therefore to be understood that within the scope of the appended claims, the invention may be practiced otherwise than as specifically described herein.

What is claimed is:

1. A runflat tire, comprising:
a tire body;
a carcass extending from a tread portion of the tire body through sidewall portions of the tire body to bead cores in bead portions of the tire body;
a belt layer formed on an outer side of the carcass in a radial direction of the tire body such that the belt layer is positioned in the tread portion of the tire body;
a band layer comprising a plurality of edge band plies and a full band ply formed on the edge band plies such that each of the edge band plies is covering a respective outer edge portion of the belt layer in an axial direction of the tire body and that the full band ply is covering substantially an entire width of the belt layer;
a plurality of sidewall-reinforcing rubber layers each having a cross-sectional crescent shape and positioned on inner sides of the carcass along the sidewall portions, respectively such that each of the sidewall-reinforcing rubber layers is forming an overlapping portion overlapping with the belt layer and an overlapping portion overlapping with a respective one of the bead portions; and
an inner liner comprising an upper inner-liner portion and a plurality of lower inner-liner portions and positioned such that the upper inner-liner portion is positioned in the tread portion and forming overlapping portions on the edge band plies of the band layer and outer edge portions of the sidewall-reinforcing rubber layers in the radial direction of the tire body and that the lower inner-liner portions are extending from an inner side onto an outer side of the tire body in the bead portions in the axial direction of the tire body and forming overlapping portions on inner edge portions of the sidewall-reinforcing rubber layers in the radial direction of the tire body, respectively,
wherein the tire body has a height Ha in a range of 8~17 mm where the height Ha is measured from a rim line of the tire body to an inner edge of an innermost dimple/fin row of the tire body in the radial direction of the tire body, the innermost dimple/fin row is formed in a dimple/fin forming region including at least one dimple/fin row comprising a plurality of dimple portions or fin portions arrayed in a circumferential direction of the tire body, the plurality of dimple portions or fin portions is configured to cool the tire body, the dimple/fin forming region is formed on an external surface of one of the sidewall portions on an outer side of the rim line between the upper and lower inner-liner portions of the inner liner in the radial direction of the tire body, the external surface of the one of the sidewall portions has a first marking-space forming region between the dimple/fin forming region and the rim line and a second marking-space forming region on an outer side of the dimple/fin forming region in the radial direction of the tire body, the first marking-space forming region forms first marking spaces including a main regulation-marking space to mark contents of regulations except for UTQG ratings among regulation-marking spaces to mark contents required by the regulations, and the second marking-space forming region forms second marking spaces including spaces for marking non-regulated contents not required by the regulations, the UTQG ratings or a combination thereof.

2. The runflat tire according to claim 1, wherein the height Ha is set in a range of 8~14 mm, and the first marking spaces include a larger marking space having a width Hb in the radial direction greater than the height Ha, and the innermost dimple/fin row does not have a dimple portion or fin portion or part of the dimple portion or the fin portion which interferes with the larger marking space.

3. The runflat tire according to claim 1, wherein the dimple/fin forming region includes a plurality of dimple/fin rows in the radial direction of the tire body, and the dimple/fin rows are formed such that the dimple/fin rows are shifted from each other in the circumferential direction of the tire body.

4. The runflat tire according to claim 1, wherein the sidewall-reinforcing rubber layer has complex elastic modulus E* set in a range of 6~12 MPa and loss tangent tan δ set in a range of 0.02~0.05.

5. The runflat tire according to claim 1, wherein the inner liner comprises a gas impermeable rubber material formed on a surface of the tire body forming an inner cavity such that the inner liner is not present between an inner edge and an outer edge of the sidewall-reinforcing rubber layer in the radial direction of the tire body.

6. The runflat tire according to claim 1, wherein the contents of at least one of the first marking spaces and the second marking spaces are molded in a concave surface recessed from the external surface of the sidewall portion.

7. A runflat tire, comprising:
a tire body having a plurality of sidewall portions, a tread portion between the sidewall portions and a plurality of bead portions;
a carcass formed inside the tire body such that the carcass is extending along a surface of the tire body from one bead core in one of the bead portions of the tire body through the tread portion of the tire body to another bead core in the other bead portion of the tire body;
a belt layer formed on an outer side of the carcass in a radial direction of the tire body such that the belt layer is positioned in the tread portion of the tire body;
a band layer comprising a plurality of edge band plies and a full band ply formed on the edge band plies such that each of the edge band plies is covering a respective outer edge portion of the belt layer in an axial direction of the tire body and that the full band ply is covering substantially an entire width of the belt layer;
a plurality of sidewall-reinforcing rubber layers positioned on inner sides of the carcass along the sidewall portions, respectively, such that each of the sidewall-reinforcing rubber layers is forming an overlapping portion overlapping with the belt layer and an overlapping portion overlapping with a respective one of the bead portions; and
an inner liner comprising an upper inner-liner portion and a plurality of lower inner-liner portions and positioned such that the upper inner-liner portion is positioned in the tread portion and forming overlapping portions on the edge band plies of the band layer and outer edge portions of the sidewall-reinforcing rubber layers in the radial direction of the tire body and that the lower inner-liner portions are extending from an inner side onto an outer side of the tire body in the bead portions in the axial direction of the tire body and forming overlapping portions on inner edge portions of the sidewall-reinforcing rubber layers in the radial direction of the tire body, respectively,
wherein the tire body has a height Ha in a range of 8~17 mm where the height Ha is measured from a rim line of the tire body to an inner edge of an innermost dimple/fin row of the tire body in the radial direction of the tire body, the innermost dimple/fin row is formed in a dimple/fin forming region including at least one dimple/fin row comprising a plurality of dimple portions or fin portions arrayed in a circumferential direction of the tire body, the plurality of dimple portions or fin portions is configured to cool the tire body, and the dimple/fin forming region is formed on an external surface of one of the sidewall portions on an outer side of the rim line between the upper and lower inner-liner portions of the inner liner in the radial direction of the tire body.

8. The runflat tire according to claim 7, wherein the external surface of the one of the sidewall portions has a first marking-space forming region between the dimple/fin forming region and the rim line, the first marking-space forming region forms first marking spaces including a main regulation-marking space to mark contents of regulations except for UTQG ratings, the first marking spaces include a larger marking space having a width Hb in the radial direction greater than the height Ha, and the innermost dimple/fin row does not have a dimple portion or fin portion or part of the dimple portion or the fin portion which interferes with the larger marking space.

9. The runflat tire according to claim 7, wherein the external surface of the one of the sidewall portions has a first marking-space forming region between the dimple/fin forming region and the rim line, the first marking-space forming region forms first marking spaces including a main regulation-marking space to mark contents of regulations except for UTQG ratings, the main regulation-marking space includes a space for marking maximum permissible inflation pressure and maximum load rating, and the marking space for maximum permissible inflation pressure and maximum load rating is divided into a marking space for maximum permissible inflation pressure and a marking space for maximum load rating which are arrayed in one row in the circumferential direction of the tire body such that the height Ha is set in a range of 8~10 mm.

10. The runflat tire according to claim 7, wherein the sidewall-reinforcing rubber layer has complex elastic modulus E* set in a range of 6~12 MPa and loss tangent tan δ set in a range of 0.02~0.05.

11. The runflat tire according to claim 7, wherein the inner liner comprises a gas impermeable rubber material formed on a surface of the tire body forming an inner cavity such that the inner liner is not present between an inner edge and an outer edge of the sidewall-reinforcing rubber layer in the radial direction of the tire body.

12. The runflat tire according to claim 7, wherein the contents of at least one of the first marking spaces and the second marking spaces are molded in a concave surface recessed from the external surface of the sidewall portion.

13. The runflat tire according to claim 7, wherein each of the sidewall-reinforcing rubber layers has a cross-sectional crescent shape.

14. The runflat tire according to claim 1, wherein the carcass comprises a plurality of ply bodies on the inner side of the tire body in the bead portions and a plurality of folded ply portions on the outer sides of the tire body in the bead portions, and the lower inner-liner portions are extending onto the folded ply portions on the outer sides of the tire body in the bead portions, respectively.

15. The runflat tire according to claim 7, wherein the carcass comprises a plurality of ply bodies on the inner side of the tire body in the bead portions and a plurality of folded ply portions on the outer sides of the tire body in the bead portions, and the lower inner-liner portions are extending onto the folded ply portions on the outer sides of the tire body in the bead portions, respectively.

16. The runflat tire according to claim 2, wherein the carcass comprises a plurality of ply bodies on the inner side of the tire body in the bead portions and a plurality of folded ply portions on the outer sides of the tire body in the bead portions, and the lower inner-liner portions are extending onto the folded ply portions on the outer sides of the tire body in the bead portions, respectively.

17. The runflat tire according to claim 7, wherein the height Ha is set in a range of 8~14 mm.

18. The runflat tire according to claim 17, wherein the carcass comprises a plurality of ply bodies on the inner side of the tire body in the bead portions and a plurality of folded ply portions on the outer sides of the tire body in the bead portions, and the lower inner-liner portions are extending onto the folded ply portions on the outer sides of the tire body in the bead portions, respectively.

19. The runflat tire according to claim 2, wherein the main regulation-marking space includes a space for marking maximum permissible inflation pressure and maximum load rating, and the marking space for maximum permissible inflation pressure and maximum load rating is divided into a marking space for maximum permissible inflation pressure and a marking space for maximum load rating which are arrayed in one row in the circumferential direction of the tire body such that the height Ha is set in a range of 8~10 mm.

20. The runflat tire according to claim 7, wherein the dimple/fin forming region includes a plurality of dimple/fin rows in the radial direction of the tire body, and the dimple/fin rows are formed such that the dimple/fin rows are shifted from each other in the circumferential direction of the tire body.

* * * * *